United States Patent [19]

Grimfjard

[11] 4,395,281

[45] Jul. 26, 1983

[54] TREATING MOLTEN PIG IRON IN A TORPEDO

[75] Inventor: Goran Grimfjard, Västerås, Sweden

[73] Assignee: Asea AB, Västeras, Sweden

[21] Appl. No.: 333,335

[22] Filed: Dec. 22, 1981

[30] Foreign Application Priority Data

Dec. 23, 1980 [SE] Sweden .............................. 8009116

[51] Int. Cl.³ .............................................. C21C 7/02
[52] U.S. Cl. ......................................... 75/53; 75/58; 75/93 R; 266/275
[58] Field of Search .................... 75/53, 58, 61, 93 R; 266/275, 276, 165

[56] References Cited

U.S. PATENT DOCUMENTS

| | | | |
|---|---|---|---|
| 3,572,671 | 3/1971 | Warner | 75/49 |
| 3,929,464 | 12/1975 | Todd | 75/53 |
| 3,944,195 | 3/1976 | Buell | 75/53 |
| 3,998,625 | 12/1976 | Koros | 75/58 |

Primary Examiner—P. D. Rosenberg
Attorney, Agent, or Firm—Kenyon & Kenyon

[57] ABSTRACT

Pig iron is tapped from a blast furnace into a torpedo in which the iron has a treating agent introduced to it while the iron is electromagnetically stirred lengthwise in the torpedo to uniformly distribute the agent throughout the iron while reducing the tendency for skulling in the torpedo.

7 Claims, 6 Drawing Figures

TREATING MOLTEN PIG IRON IN A TORPEDO

In the manufacture of steel molten pig iron is sometimes tapped from the blast furnace into a torpedo which functions both to transport the iron to the steel making furnace and for the treatment of the iron while in the torpedo.

The torpedo is a horizontal, generally cylindrical container having tapered ends causing it to look like a torpedo. It has a steel shell and a refractory lining and is formed with a central opening in its top through which the iron is teemed and through which the iron is ultimately poured by rotation of the torpedo about its axis. For transporting the iron the torpedo is carried on trucks, in the form of a torpedo car, which runs on rails, inversion being possible either because the torpedo has journaled end trunnions or by inversion of the torpedo car.

The torpedo may have a capacity holding from 100 to 300 tons of iron. Treatment of the iron while in the torpedo to reduce one or more of its components requiring reduction or substantial elimination in the steel making furnace, can materially reduce the burden of the steel making phase.

For example, a reduction in the iron's sulphur content is of particular advantage. There is an increase demand for steels with lower sulphur contents. At the same time there is a shortage of low-sulphur coke for use in the blast furnace.

For desulphurization a lance is inserted in the iron in the torpedo and by the use of pressurized gas injects a desulphurizing agent into the iron. Examples of such agents are calcium carbide, lime and various mixtures commonly known to have desulphurizing properties. They are used in the form of solid particles. The velocity of the agent propelled by the gas is depended on to obtain a mixture of the agent with the iron.

The above practice has the disadvantage that the reaction zone is largely concentrated around the tip of the lance. In this zone the reaction rate which at first may be rapid, slows as the available sulphur in the zone reduces, resulting in undesirably low desulphurizing efficiency. Another disadvantage is that a high skulling rate is relatively common, causing premature shutdown of the torpedo's operation for the removal of the skull and possibly requiring relining of the torpedo.

The object of the present invention is to eliminate or at least reduce the severity of the above disadvantages so as to provide for more efficient desulphurization in particular, together with a reduction in the incidental skulling.

Briefly summarized, this invention is characterized by electromagnetically stirring the pig iron in the torpedo in a substantially horizontal direction while the treating agent is being introduced to the iron, usually by injection through a lance. Preferably, the stirring direction is substantially longitudinal with respect to the torpedo. When using a lance, or any other practical means, the treating agent is necessarily introduced at a substantially fixed zone in the pig iron, but the electromagnetic stirring of the iron improves the intermixing between this zone and the rest of the iron melt. The agent is ordinarily in the form of solid particles, and the electromagnetic stirring should be adequately intense to spread them throughout the pig iron and substantially increase the agent's reaction with the undesired component, such as sulphur. In addition, stirring intensity should be adequate to reduce the formation of a skull or skulls in the torpedo's inside or lining. The electromagnetic stirring should be continuous during the introduction of the agent which normally is continuous for a period of time.

the torpedo shell should be made with one or more magnetically permeable windows, as by the use of non-magnetic stainless steel plate. This permits an electromagnetic stirrer to be positioned on the outside of the torpedo's shell opposite to each window, each stirrer being of the straight type and oriented horizontally and preferably longitudinally with respect to the torpedo. The permeable window can be made extensive enough to permit the stirrer in each instance, to be moved to different locations relative to the torpedo, as experience indicates provides the best distribution of the agent and the minimum amount of skulling.

The accompanying drawings schematically illustrate the principles of this invention, the various views being as follows.

Figure 1:
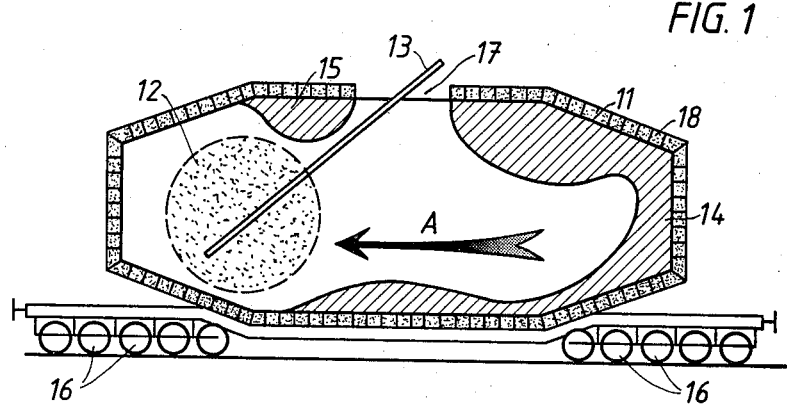
FIG. 1 is a longitudinal vertical section of a torpedo car and illustrates the problems solved by this invention.

In these drawings the torpedo 11 having a metal plate shell internally provided with the usual refractory lining, is shown, the usual fixed reaction zone being indicated at 12 formed by the injection of the agent, such as the desulphurization agent, in the form of solid particles blown into the iron via the lance 13. To avoid confusion the iron itself is not indicated. For practical reasons the injection velocity is inadequate to avoid the formation of the concentrated reaction zone 12. However, there is of course some incidental iron flow, this resulting in the skulling indicated at 14 and 15 by the cross hatching. Under the conditions illustrated this skulling occurs with undesirable rapidity and the skulls must be removed with a consequent shutdown of the torpedo and possibly requiring relining of the torpedo.

The torpedo is shown in the form of a torpedo car with its trucks 16 and torpedo top opening 17 through which the lance 13 is inserted and through which the torpedo is filled and later emptied by rotation of either the torpedo relative to its trucks.

Figure 2:
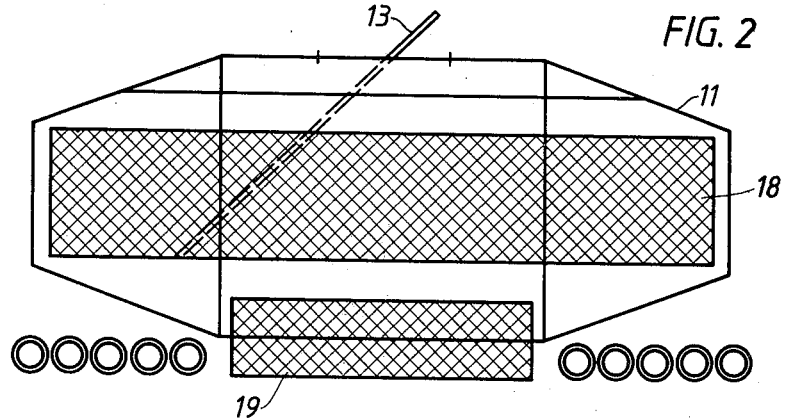
FIG. 2 is a side view illustrating one example of the stirrer locations.
Figure 3:
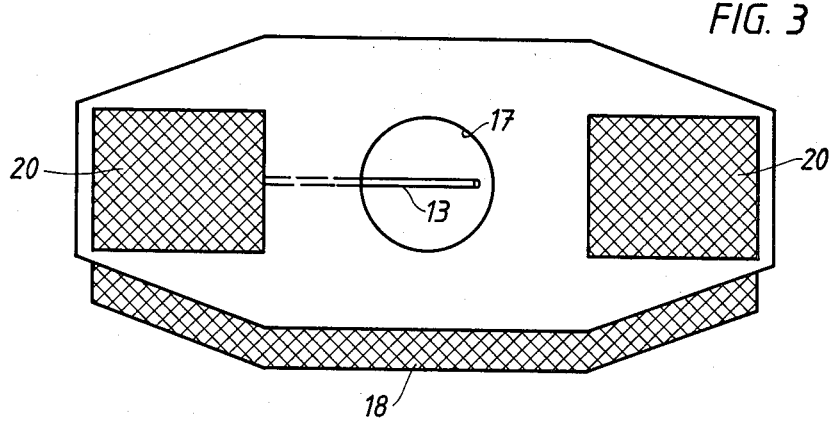
FIG. 3 is a top view providing another example of the stirrer locations.

FIG. 2 shows one example of electromagnetically stirring zones at 18 and 19, while FIG. 3, looking down at the top of the torpedo, shows the zone 19 replaced by two end zones 20.

As previously indicated, straight electromagnetic stirrers are used, oriented to provide the stirring zones indicated by FIGS. 2 and 3, with the torpedo shell being made of non-magnetic metal, such as non-magnetic stainless steel, as required to form magnetically permeable windows throughout the various stirring zones. Otherwise, the shell can be made of magnetic steel as usual.

Figure 4:
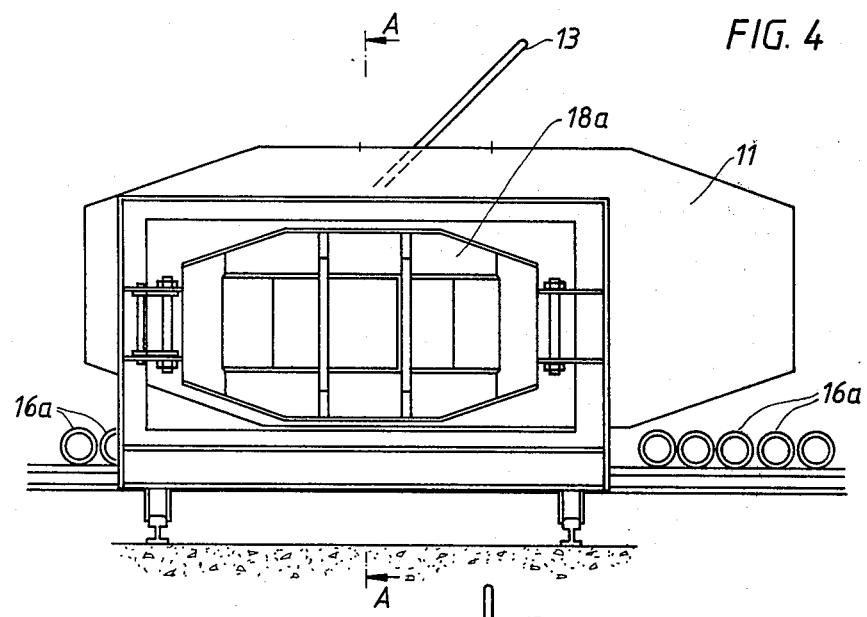
FIG. 4 is a side view of the stirrer car provided with an electromagnetic stirrer.
Figure 5:
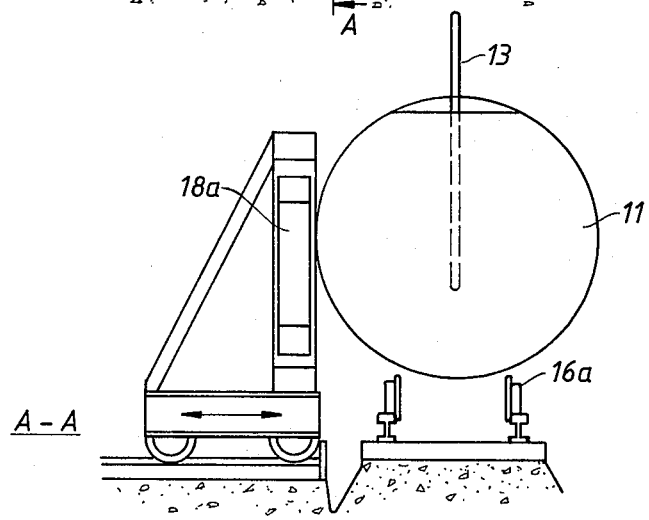
FIG. 5 is a cross section of a portion of FIG. 4.
Figure 6:
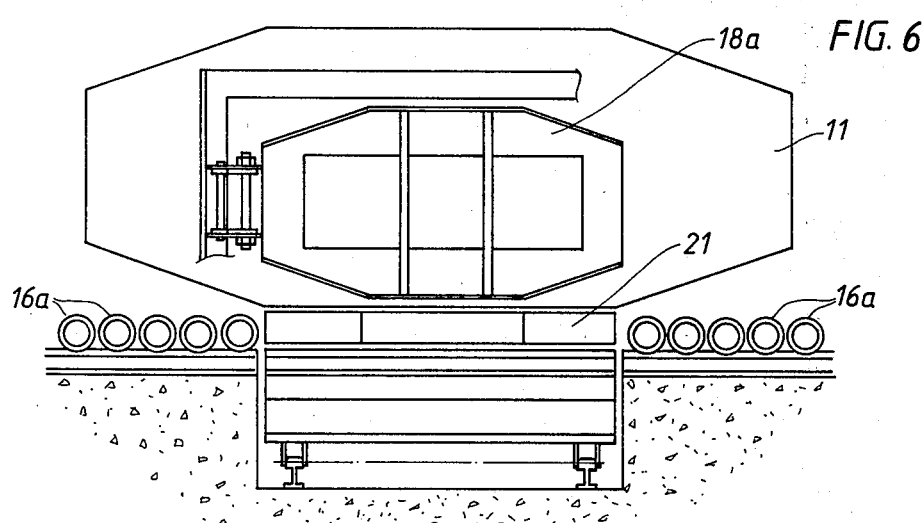
FIG. 6 is a side view of a stirrer car showing stirrers located in accordance with the FIG. 2 example.

In FIGS. 4 and 5 the stirrer beside the torpedo, used to form the zone 18, is illustrated at 18a, the trucks 16a being interspaced so that the entire bottom of the torpedo is free. With this arrangement the torpedo car can be stopped and, as indicated by FIG. 6, the stationary electromagnetic stirrer 21 moved against the bottom of the torpedo, the bottom being made of non-magnetic metal. Although not illustrated the stirrers 18a can be fixed to the torpedo shell with the construction such as to provide clearance for the stirrer from the rail trackway when the torpedo car travels.

FIG. 6 illustrates the electromagnetic stirrer 18a providing the zone 18 of FIG. 2 while coextensively therewith a bottom stirrer 21 is provided, the torpedo shell in all cases being made to permit penetration of the traveling multi-phase AC field of the electromagnetic stirrer involved.

In all cases it is possible to provide for a stirrer to be adjusted to different positions relative to the torpedo and the stirrer can be either a separate part or made as a part of the torpedo.

It can now be appreciated that with the electromagnetic stirring extending longitudinally as indicated by the arrow A in FIG. 1 that the zone 12 shown in FIG. 1 is not formed, at least to any material extent. In the case of desulphurizing the solid agent particles injected by the lance 13, are kept distributed throughout the iron for the length of the torpedo, providing both for a uniform reaction rate through the iron and avoiding or substantially reducing the skulling shown at 14 and 15 in FIG. 1.

The construction of a straight electromagnetic stirrer is known and therefore is not illustrated in detail. It has coils, one for each phase of the multi-phase AC used and appropriate pole pieces linearly arranged. When powered with a traveling field multi-phase AC the stirrer induces a corresponding traveling multi-phase current in the iron which thrusts the iron in one direction or the other depending on the direction of the field. The direction need not necessarily be as indicated by the arrow A in FIG. 1 because when in the reverse direction the stirring effect is also the same with substantially the same results. When a stirrer is made movable relative to the torpedo and the torpedo's non-magnetic window is extensive enough to embrace the range of the movement, appropriate adjustment of the relative locations may serve to maximize the effective distribution of the agent and skulling reduction. Even if in FIGS. 4 and 5 the stirrer 18a is fixed in position the stirrer car can be moved back and forth to provide the exact position.

The stirring intensity obtained depends on the capacity and powering of the stirrer and should be adequate to provide vigorous spreading of the treating agent particles throughout the iron so as to increase the uniformity of the agent's reaction. This is particularly desirable when the iron contains sulphur and the agent is one of the desulphurization agents.

Another advantage of this invention is that by directing the traveling magnetic field away from the opening 17 during inversion of the torpedo after the treatment, the discharge of the treated iron can be made without the slag running out. This slag, formed by the reaction, is therefore more apt to remain in the torpedo while the iron discharges.

What is claimed is:

1. A method for treating molten pig iron containing sulfur, in the torpedo of a torpedo car, the torpedo comprising a horizontal generally cylindrical body having tapered ends extending horizontally from both ends thereof and the body having a substantially central opening in its top and through which a lance is inserted into the iron and a desulfurizing agent is blown through the lance into the iron by compressed gas for reaction with the sulfur in the iron; wherein the improvement comprising providing the torpedo with at least one longitudinally extending magnetically permeable window and positioning at least one straight electromagnetic stirrer longitudinally on the outside of the window so as to project a traveling multi-phase AC field into the iron causing stirring of the iron longitudinally in the torpedo.

2. The method of claim 1, in which the agent is introduced to a substantially fixed zone in the pig iron.

3. The method of claim 2 in which the agent is in the form of solid particles and the stirring is adequately intense to spread the particles throughout the pig iron and increase the uniformity of the agent's reaction with the sulphur.

4. The method of claim 3 in which the stirring intensity is adequate to reduce the formation of a skull in the torpedo's inside.

5. The method of claim 4 in which the torpedo is inverted to discharge the pig iron after the treatment and the stirring is directed so as to at least retard the simultaneous discharge of slag with the pig iron.

6. A torpedo car having a horizontal longitudinally extended torpedo adapted to contain pig iron for its treatment, the torpedo having at least one longitudinally extending wall portion which is non-magnetic and at least one electromagnetic stirrer positioned opposite to said portion so as to stir the pig iron when it is in the torpedo, the stirrer being a straight stirrer and positioned longitudinally with respect to the torpedo.

7. The torpedo of claim 6 in which the torpedo and stirrer are movable relative to each other and the torpedo's non-magnetic portion is extensive enough to embrace the range of the movement.

* * * * *